(No Model.)
C. ZIMMERMAN.
PORTABLE WIND BRAKE FOR THRASHING MACHINES.
No. 516,560. Patented Mar. 13, 1894.
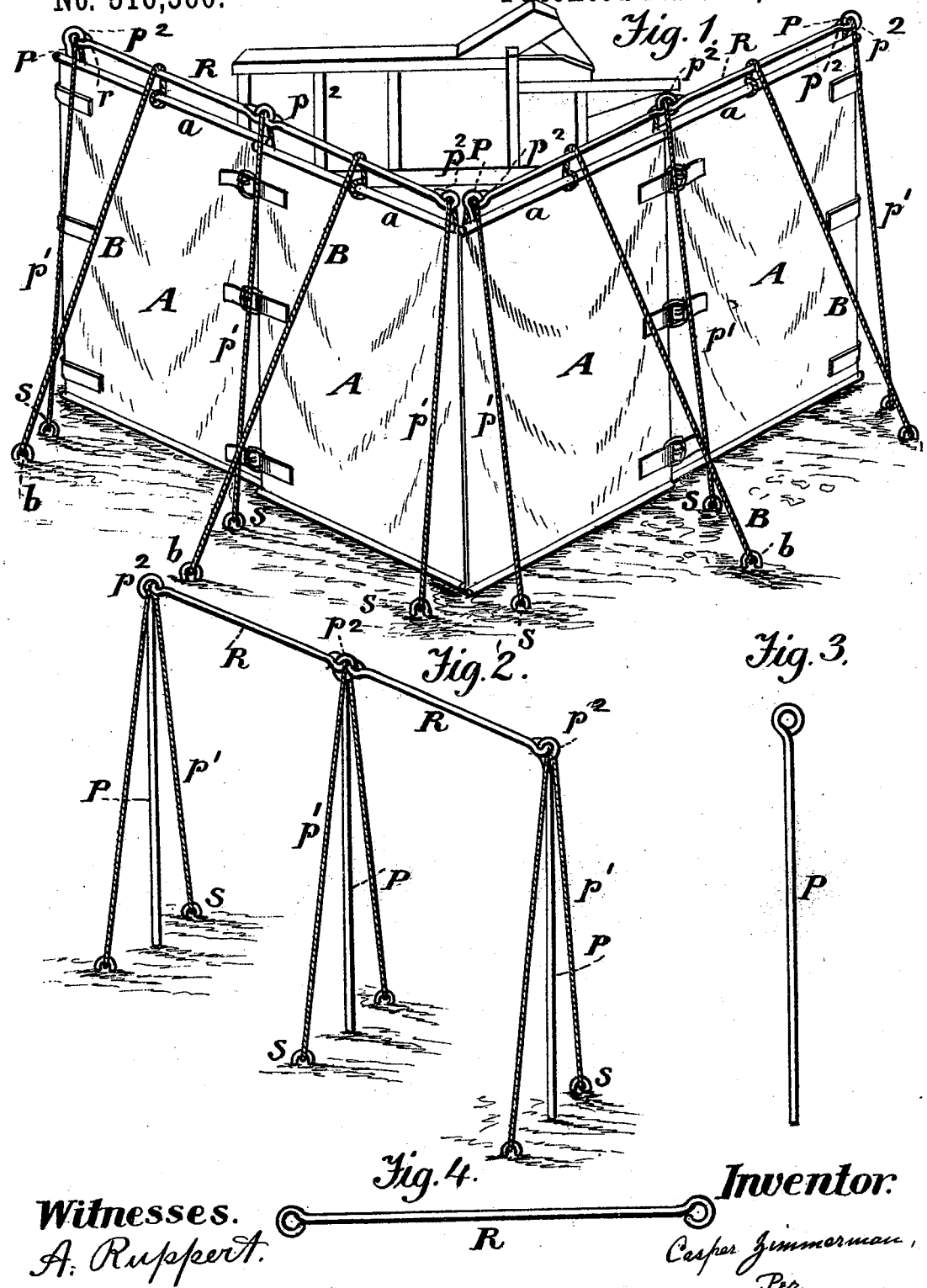
Witnesses.
A. Ruppert.
H. A. Daniels
Inventor:
Casper Zimmerman,
Per
Thomas P. Simpson.
atty.

UNITED STATES PATENT OFFICE.

CASPER ZIMMERMAN, OF CASTLEWOOD, SOUTH DAKOTA.

PORTABLE WIND-BRAKE FOR THRASHING-MACHINES.

SPECIFICATION forming part of Letters Patent No. 516,560, dated March 13, 1894.

Application filed October 2, 1893. Serial No. 487,014. (No model.)

*To all whom it may concern:*

Be it known that I, CASPER ZIMMERMAN, a citizen of the United States, residing at Castlewood, in the county of Hamlin and State of South Dakota, have invented certain new and useful Improvements in Wind-Brakes for Thrashers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a portable windbrake for thrashing machines on the prairies or wherever the wind often blows with great force. It may, however, be used with equal benefit for other special purposes—as in stacking hay or grain. As grain is thrashed on the prairie, without a brake, much is blown away, while the operatives who take care of the grain as it is fed to the machine or issues therefrom, and those who manipulate the straw, work to great disadvantage and with much inconvenience.

Figure 1 of the drawings is a perspective view representing a thrasher with my windbrake; Fig. 2 an elevation, showing the skeleton-frame with two connected panels; Fig. 3 a detail view of one of the vertical posts; Fig. 4 a detail view of one of the hook-rails.

In the drawings, A represents the canvas sections which I prefer but for which any other suitable material may be substituted. Each of these is provided with a bead or wire inclosed horizontally at the top in a pocket or "turn over" of the canvas. To the middle of this rod $a$, I secure one end of a cord or rope B, while the sides of the canvas sections are secured together by buckles and straps as shown in Fig. 1 of the drawings or by any other detachable fastening.

P represents the posts whose lower ends are buried in the ground and the upper ones provided with eyes, the post being held firmly in a vertical position by the guy or brace ropes $p'$ extending from the top in different directions to the ground where they are secured to stakes S.

R represents the rails, each of which is provided with a hook at both ends, the same being adapted to engage the eyes of the posts, the posts and top rails being connected by hooks and eyes $p^2$. Over these rails, which preferably stand about fifteen feet from the ground, pass the cords B from the inside, while they are secured to stakes $b$ in the ground, thereby holding the canvas sections up to the rails.

As shown in Fig. 1 of the drawings, the brake is arranged in two vertical planes at right angles to each other or at any other preferred angle, the exterior vertex of the angle being made to face the wind so as to change its direction or rather to divide the current into two which take divergent courses. As the thrasher is moved about from point to point on the prairie, the portable brake is also moved and set with its angle pointing in the direction of the wind.

I am aware that canvas, posts and guy ropes have long been in use for tents and windbrakes but

What I claim as new, and desire to secure by Letters Patent, is—

The combination, in a windbrake, of the metallic posts and top rails P, R, connected by hooks and eyes $p^2$, the sections A of canvas adapted to cover the spaces between the posts and each provided with means for detachably securing together their contiguous edges, and the top rod $a$ secured in a "turnover" of the canvas and ropes or cords secured at one end to the rods $a$ and adapted to be secured at the other end to ground stakes as shown and described.

In testimony whereof I affix my signature in presence of two witnesses.

CASPER ZIMMERMAN.

Witnesses:
J. P. CHEEVER,
LILLIE PRENTICE.